United States Patent
Phillips et al.

[11] Patent Number: 5,990,290
[45] Date of Patent: Nov. 23, 1999

[54] BLUE REACTIVE DYESTUFFS

[75] Inventors: Duncan Adrian Sidney Phillips, Lancs; John Anthony Taylor, Prestwich, both of United Kingdom; Yung-Chien Kao, Taoyuan, Taiwan

[73] Assignee: Everlight USA, Inc., Pineville, N.C.

[21] Appl. No.: 09/205,354

[22] Filed: Dec. 4, 1998

[51] Int. Cl.[6] ................................................. C09B 62/513
[52] U.S. Cl. ........................ 534/637; 534/605; 534/612
[58] Field of Search .................................. 534/637, 605, 534/612

[56] References Cited

U.S. PATENT DOCUMENTS

| | | | |
|---|---|---|---|
| 4,801,694 | 1/1989 | Scheibli et al. | 534/637 |
| 5,831,040 | 11/1998 | Reichert | 534/637 |

*Primary Examiner*—Fiona T. Powers
*Attorney, Agent, or Firm*—Bacon & Thomas, PLLC

[57] ABSTRACT

The present invention provides the blue dyestuffs of the following formula (I),

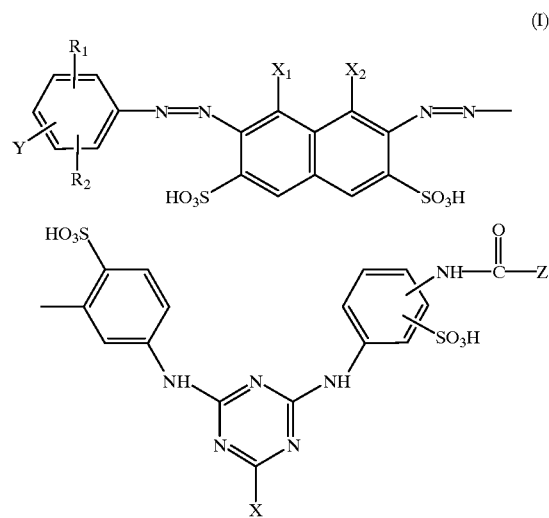

wherein $R_1$, $R_2$, X, $X_1$, $X_2$, Y, and Z are defined in this document. These kinds of dyestuffs are suitable for dyeing and printing of materials containing either cellulose fibers, such as cotton, synthetic cotton, hemp, and synthetic hemp, or synthetic polyamide and polyurethane fibers, such as wool, silk, and nylon.

13 Claims, No Drawings

BLUE REACTIVE DYESTUFFS

FIELD OF THE INVENTION

The present invention relates to a reactive dyestuff, especially relates to a novel blue reactive dyestuffs.

SUMMARY OF THE INVENTION

The present invention provides the blue reactive dyestuffs of the following formula (I):

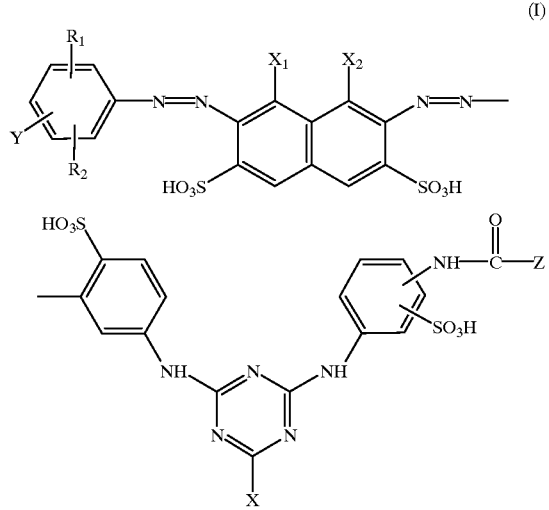

(I)

wherein:

R$_1$ and R$_2$ each independent is hydrogen, halogen, C$_{1-4}$ alkyl, C$_{1-4}$ alkoxyl, or sulfonyl groups;

X is halogen or quaternary ammonium, and it is preferred that X is fluorine or chlorine;

X$_1$ and X$_2$ each independent is hydroxyl or amino; it is preferred that X$_1$ is hydroxyl and X$_2$ is amino, or X$_1$ is amino and X$_2$ is hydroxyl;

Y is —SO$_2$CH$_2$=CH$_2$ or —SO$_2$C$_2$H$_4$W, W is a leaving group (e.g. halogen, acetyl, phosphate, trisufate, and sulfate; wherein sulfate is preferably) which is eliminable by a base;

Z is —CHTCH$_2$T or —CT=CH$_2$, T is halogen, —OH, —OSO$_3$H, or a leaving group which is eliminable by a base; and it is preferred that T is chlorine or bromine.

The present invention provides the blue reactive dyestuffs with multiple reactive groups. The dyestuffs of the present invention have the characteristics of high color fastness and high exhaustion rate, when dyeing the cellulose fibers. Additionally, these kinds of dyestuffs are stable in the storage, the bonding stability between dye and fiber is very high, and the color reproducibility effect is getting better after dyeing. Due to the high fastness of colors, the dye residue in the waste water can be reduced. The high use percentage of dye means reduction of cost, and the environmental problems from the waste water can be reduced or even eliminated. Consequently, multiple reactive groups are introduced to the main body of the dye, which may result in the characteristics of high color fastness and high exhaustion rate when dyeing the cellulose fibers. Furthermore, the color reproducibility is getting better, and the high fastness can be obtained.

These kinds of dyestuffs are suitable for dyeing and printing of materials containing either cellulose fibers, such as cotton, synthetic cotton, hemp, and synthetic hemp, or synthetic polyamide and polyurethane fibers, such as wool, silk, and nylon. The dyestuffs are also suitable for dyeing and printing of cellulose fibers, polyamide fibers, polyurethane fibers, polyacrylic fibers and other blends. Materials of high degree dye fastness can be obtained.

DESCRIPTION OF THE PREFERRED EMBODIMENTS

The blue reactive dyestuffs of formula (I) of the present invention can be synthesized by the following method A or method B.

Method A:

First of all, a diazonium salt of the following formula (1)

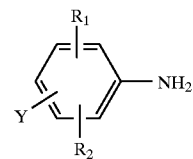

(1)

wherein R$_1$, R$_2$, and Y are defined as the above, is coupled with 1-amino-8-hydroxyl naphthalene-3,6-disulfonic acid. Examples of suitable formula (1) are:

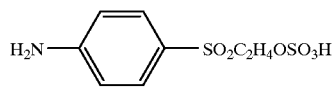

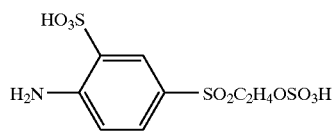

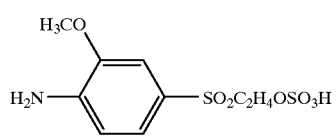

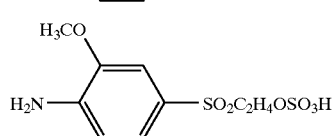

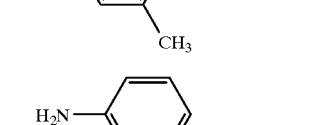

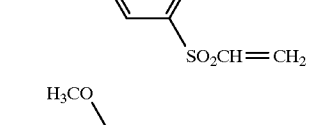

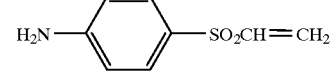

-continued

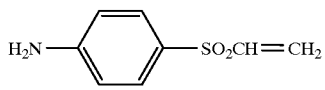

The temperature of the coupling reaction is controlled between 0 to 40° C., and below 30° C. is preferred. The pH is controlled between 1 to 3, and below 2 is preferred. Upon completion of the coupling reaction, the compound of the following formula (2)

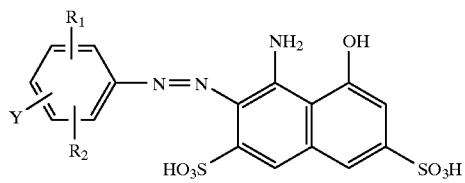

(2)

Wherein $R_1$, $R_2$, and Y are defined as the above, can be obtained. Then 2,4-diamino benzene sulfonic acid and trihalogentriazine are condensed to obtain the compound of the following formula (3), wherein X is defined as the above.

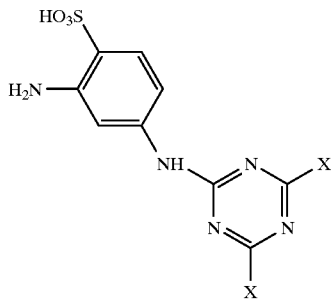

(3)

Then the diazonium salt of the formula (3) is coupled with the compound of the above formula (2). The reactive temperature is controlled between 0 to 40° C., and below 30° C. is preferred. The pH is controlled between 6 to 7, and 6.0 to 6.5 is preferred. Upon completion of the coupling reaction, the compound of the following formula (4)

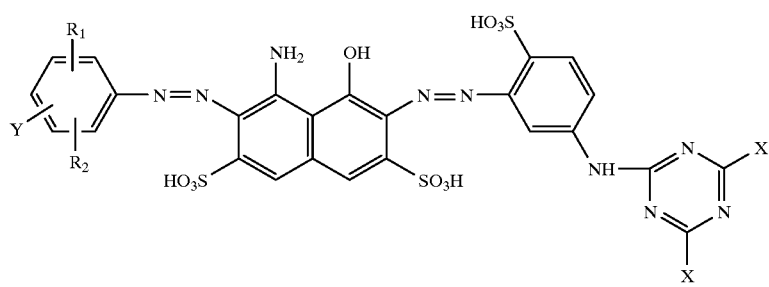

(4)

wherein $R_1$, $R_2$, X, and Y are defined as the above, can be obtained. Examples of the formula (4) are:

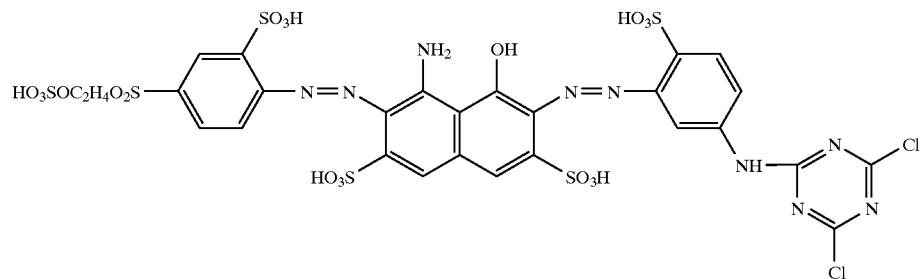

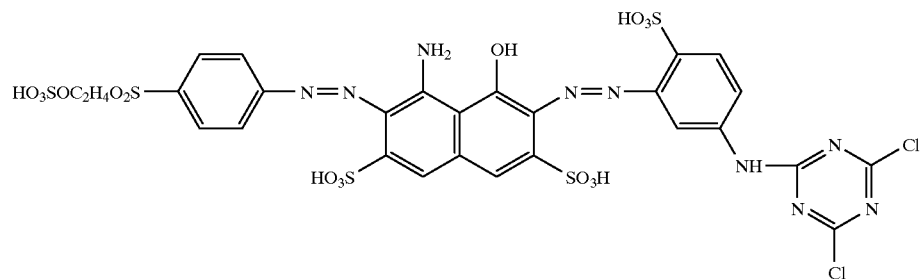

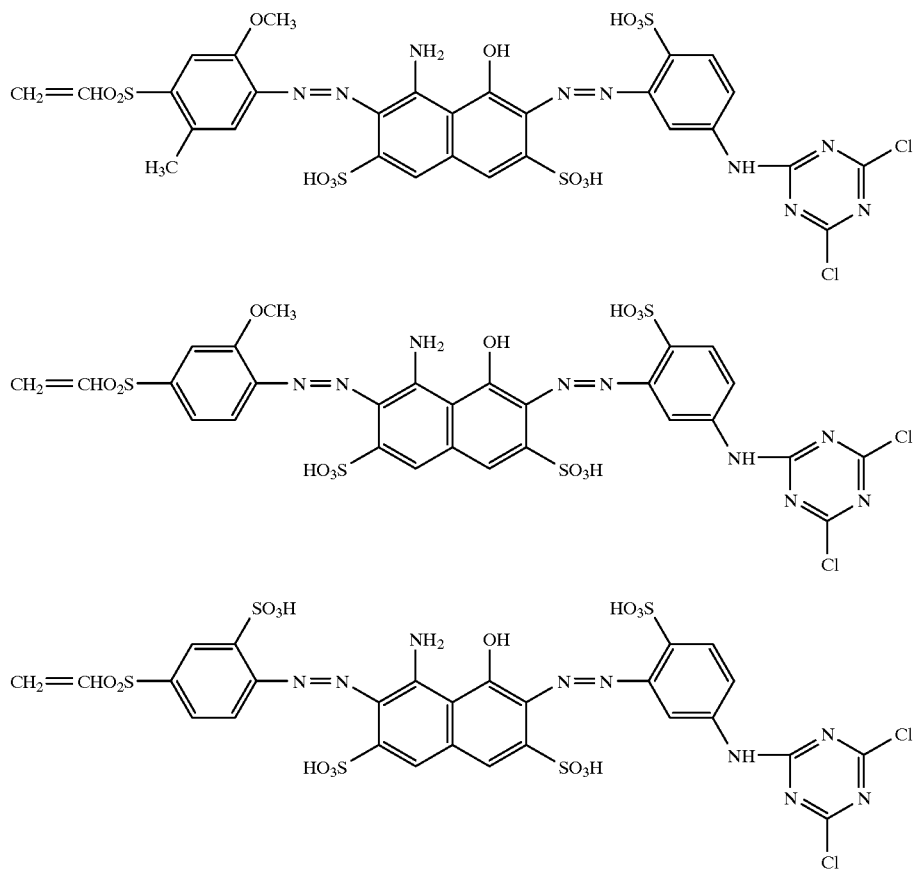

2,4-Diamino benzene sulfonic acid is condensed with the compound of the following formula (5),

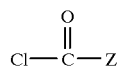 (5)

wherein Z is defined as the above. The reactive temperature is controlled between 0 to 25° C., and 0 to 10° C. is preferred. The pH is controlled between 2 to 7, and 5 to 7 is preferred. Then the compound of the following formula (6)

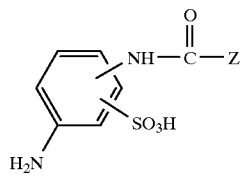 (6)

wherein Z is defined as the above, can be obtained.

The compound of the formula (6) is condensed with the compound of formula (4). The reactive temperature is controlled between 0 to 40° C., and below 30° C. is preferred. The acid generated in the reaction is then neutralized by adding the acid-binding agent, and the pH is controlled between 4 to 7, and 4.5 to 6.5 is preferred. After fully stirred, the compound of the following formula (I')

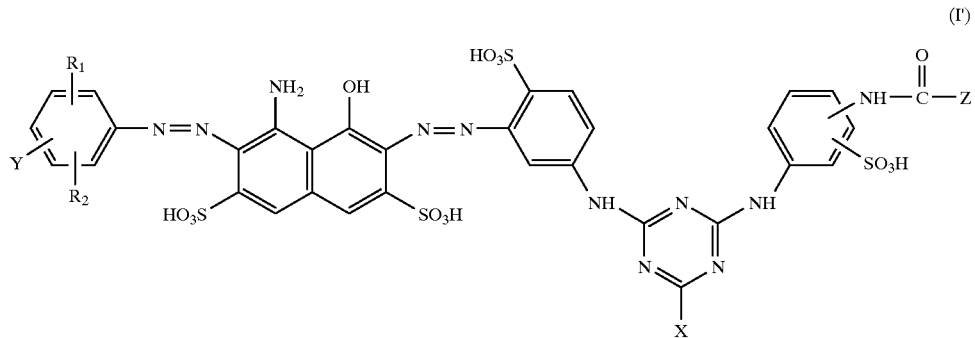
(I')

wherein $R_1$, $R_2$, X, Y and Z are defined as the above, can be obtained. The compound of the formula (I') is one of the blue reactive dyestuffs of the present invention.

Method B:

The diazonium salt of the formula (3) is coupled with 1-amino-8-hydroxyl naphthalene-3,6-disulfonic acid. The coupling reaction temperature is controlled between 0 to 40° C., and below 30° C. is preferred. The pH is controlled between 1 to 3, and below 2 is preferred. Upon completion of the coupling reaction, the compound of the following formula (7) can be obtained.

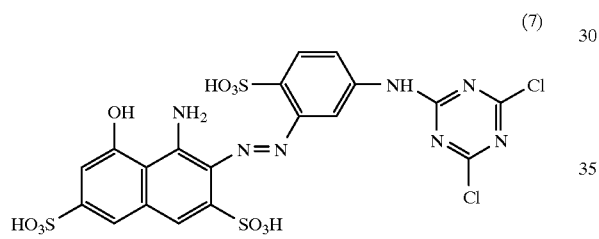
(7)

The diazonium salt of the above formula (1) is coupled with the compound of the formula (7). The reactive temperature is controlled between 0° C. to 40° C., and below 30° C. is preferred. The pH is controlled between 6 to 7, and 6.0 to 6.5 is preferred. Then the compound of the following formula (8)

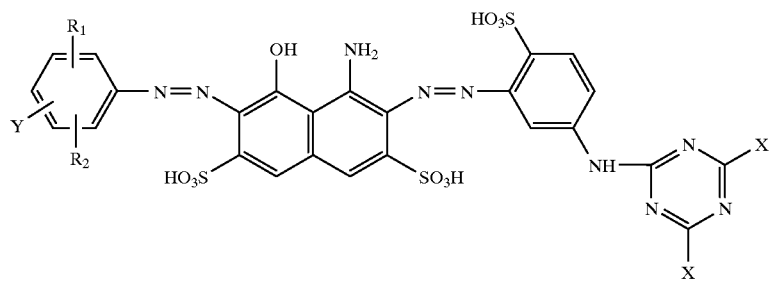
(8)

wherein $R_1$, $R_2$, X, and Y are defined as the above, can be obtained. Examples of the formula (8) are:

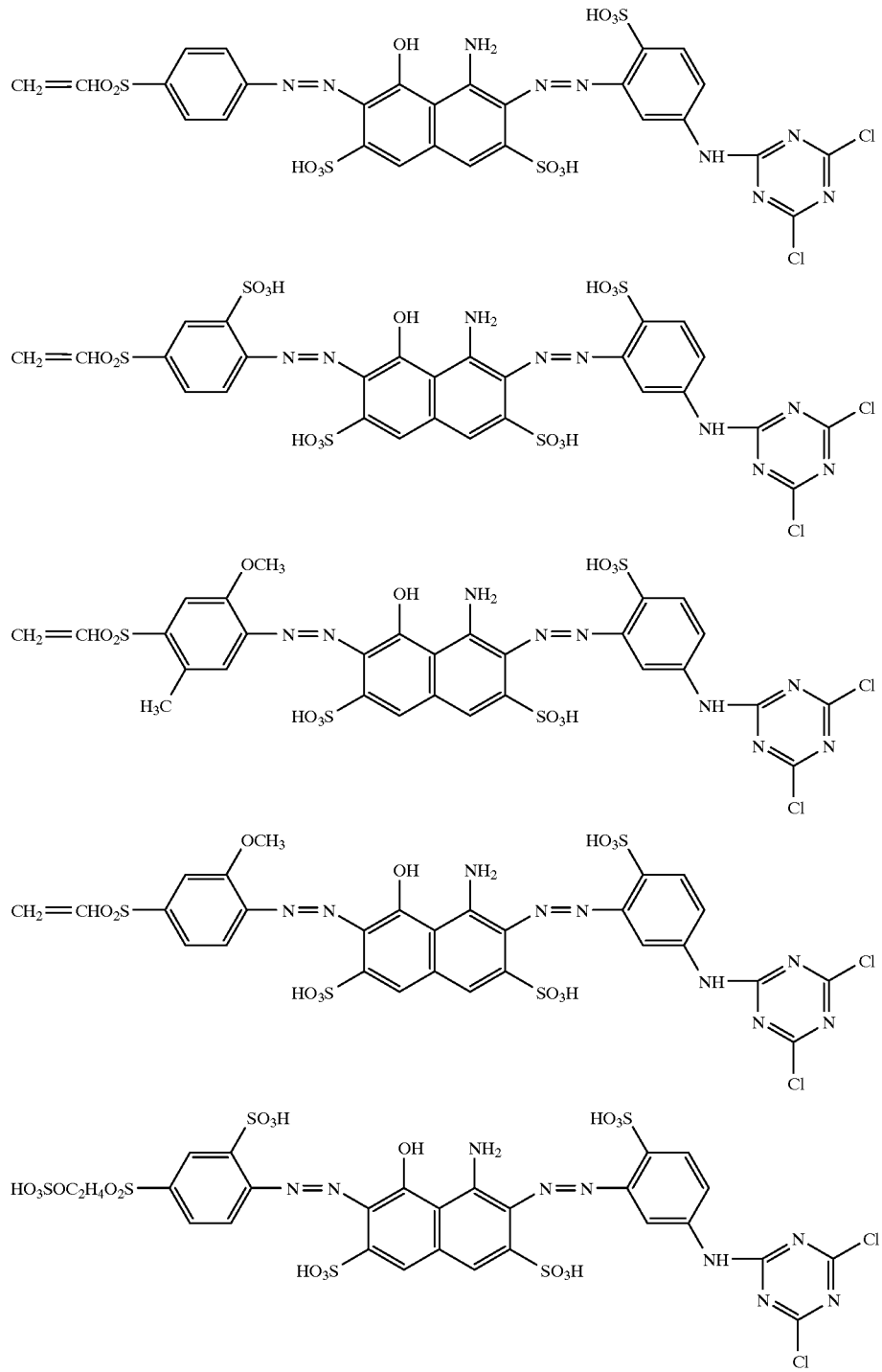
The compound of the formula (8) is condensed with the compound of the above formula (6), and the compound of the following formula (I")

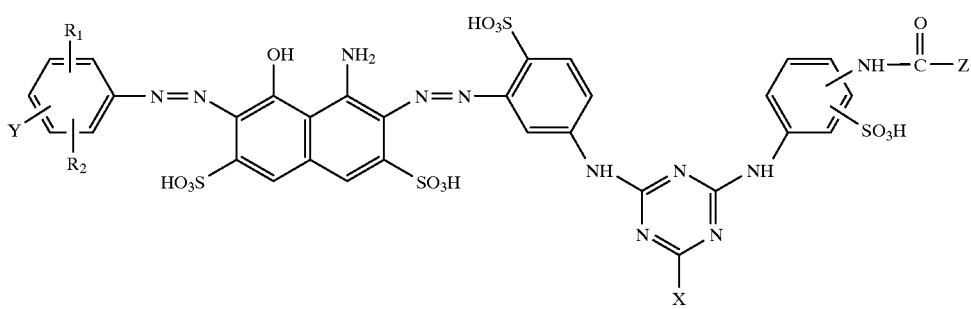

(I")

wherein $R_1$, $R_2$, X, Y, and Z are defined as the above, can be obtained. The compound of the formula (I") is one of the blue reactive dyestuffs of the present invention.

In the manufacture process, the suitable acid-binding agents are alkali metal hydroxides, alkali metal carbonates, or alkali metal bicarbonates. The hydroxides, carbonates, or bicarbonates of sodium, potassium, or lithium are preferably, and particularly sodium carbonates or bicarbonates are most preferably.

The dyestuffs of the present invention can be produced by the above methods, and the reactive conditions were fully described in the above explanation. Similarly, the dyestuffs can be purified by known processes such as spray drying, precipitation, or filtration.

The dyestuffs of the present invention can be in the form of powder, granular, particle or liquid and an auxiliary reagent, for example, retarding agent, leveling agent, assistant agent, surfactant agent, or dispersing agent may be added.

The dyestuffs of the present invention all contain anion group, such as sulfonyl group. For convenience in statement, they are expressed as free acid in the specification. When the dyestuff of present invention is manufactured, purified or used, it often exist in the form of water soluble salt, especially the alkaline metallic salt, such as sodium salt, potassium salt or ammonium salt.

More detailed examples are used to illustrate the present invention, and these examples are used to explain the present invention. The examples below, which are given simply by way of illustration, must not be taken to limit the scope of the invention.

In examples, the compound is represented by free acid, but its actual form can be metallic salt, or more possibly alkali salt, especially sodium salt.

EXAMPLE 1

Trichlorotriazine (5.5 g) was first uniformly distributed in ice water(50 ml), then a solution of 2,4-diamino benzene sulfonic acid (5.6 g) in 150 ml of water was added. The mixture was then stirred for half hour and the pH was controlled between 6.0 to 6.5 for the full reaction. Then the resultant mixture was formed the diazonium salt solution (A) by known methods.

Add diazonium salt of 4-((2-(sulfooxy) ethyl) sulfonyl) phenylamine (prepared from 8.4 g 4-((2-(sulfooxy) ethyl) sulfonyl) phenylamine ) into a solution of 1-amino-8-hydroxyl naphthalene-3,6-disulfonic acid (9.6 g) in 100 ml of water. Sodium bicarbonate was used to control the pH between 1.0 to 3.0, and the mixture was stirred until full reaction. Then the mixture was added into the above solution (A) and stirred at a pH of 6.0–6.5 until fully reacted. Then a solution of 2,4-diamino benzene sulfonic acid (5.6 g) in 100 ml of water was added. The pH was controlled between 5.5 to 6.0 and temperature was controlled at 30° C. The solution was stirred until full reaction. Then the solution temperature was controlled at 5° C. and 2,3-dibromo propanoyl chloride (7.5 g) was added. The solution was stirred until full reaction, and the dyestuff of the following formula (I-1) could be obtained. After salting, drying and grinding, a blue dye powder could be obtained. The dyestuff can be used to dye objects in blue, with excellent property.

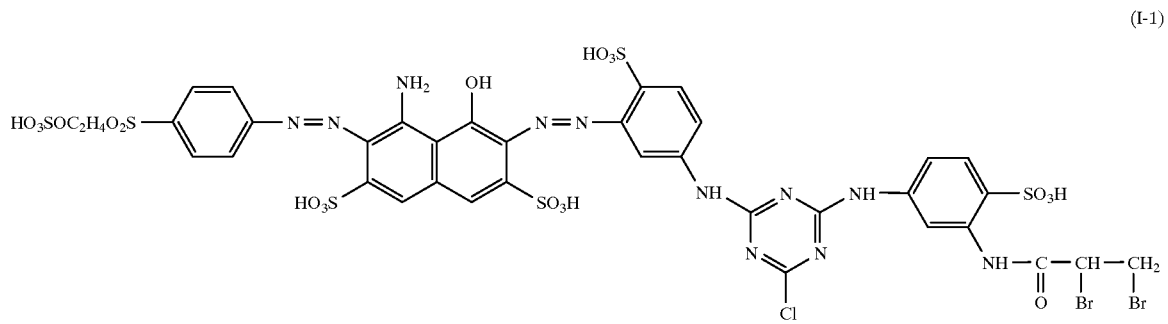

(I-1)

EXAMPLE 2

Refer to the procedure of example 1, substitute 4-((2-(sulfooxy) ethyl) sulfonyl) phenylamine with 2-amino-5((2-(sulfooxy) ethyl) sulfonyl) benzene sulfonic acid to obtain blue dyestuff of formula (I-2). After salting, drying and grinding, a blue dye powder could be obtained. The dyestuff can be used to dye objects in blue, with excellent property.

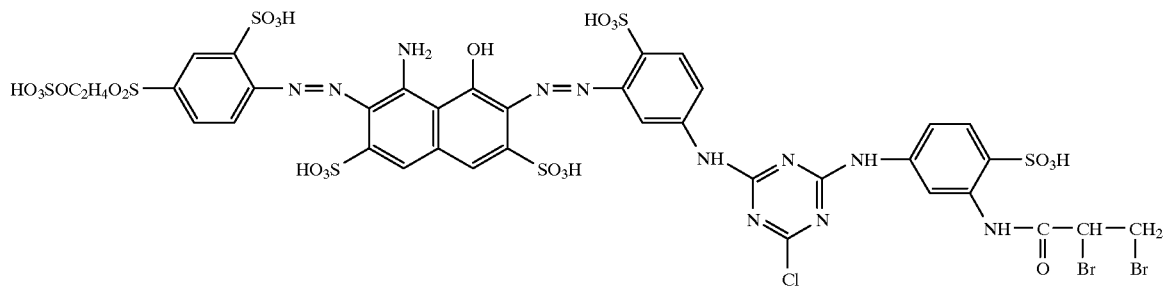

(I-2)

EXAMPLE 3

Refer to the procedure of example 1, substitute 4-((2-(sulfooxy) ethyl) sulfonyl) phenylamine with 2-amino-5-(vinyl sulfonyl) benzene sulfonic acid to obtain blue dyestuff of formula (I-3). After salting, drying and grinding, a blue dye powder could be obtained. The dyestuff can be used to dye objects in blue, with excellent property.

was controlled at 5° C. The mixture solution was stirred until full reaction. Then a solution of 4-((2-(sulfooxy) ethyl) sulfonyl) phenylamine (8.4 g) in 50 ml of water was added and stirred at a pH between 6.0 to 6.5 until fully reacted. Then a solution of 2,4-diamino benzene sulfonic acid (5.6 g) in 100 ml of water was added and stirred at a pH between 5.5 to 6.0 and temperature at 30° C. until fully reacted. Then 2,3-dibromo propanoyl chloride (7.5 g) was added and the pH was controlled between 4.5 to 6.5 and the temperature

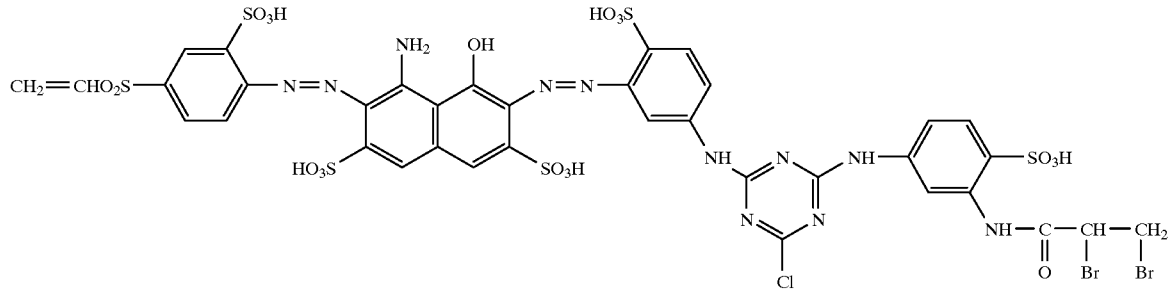

(I-3)

EXAMPLE 4

Trichlorotriazine (5.5 g) was first uniformly distributed in ice water(50 ml), then a solution of 2,4-diamino benzene sulfonic acid (3.4 g) in 150 ml of water was added. The mixture was then stirred for half hour and the pH was controlled between 6.0 to 6.5. Then the resultant mixture was formed the diazonium salt solution by known methods. A solution of 1-amino-8-hydroxyl naphthalene-3,6-disulfonic acid(9.6 g)in 100 ml of water was added. The pH of mixture was controlled below 3.0 and the temperature was controlled between 0 to 5° C. The solution was stirred until full reaction, then the dyestuff of the following formula (I-4) could be obtained. After salting, drying and grinding, a blue dye powder could be obtained. The dyestuff can be used to dye objects in blue, with excellent property.

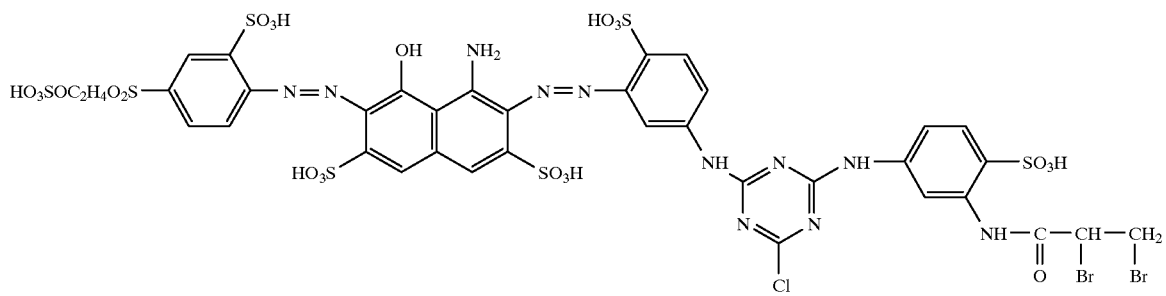

(I-4)

EXAMPLE 5

Refer to the procedure of example 4, substitute 4-((2-(sulfooxy) ethyl) sulfonyl) phenylamine With 4-(vinyl sulfonyl)-5-methyl-2-methoxy phenylamine, to obtain blue dyestuff of formula (I-5). After salting, drying and grinding, a blue dye powder could be obtained. The dyestuff can be used to dye objects in blue, with excellent property.

temperature of 0 to 5° C. until full reaction. Then hydrochloric acid solution was added to control the pH at 7.0 and the dyestuff of formula (I-7) was obtained. After salting, drying and grinding, a blue dye powder could be obtained. The dyestuff can be used to dye objects in blue, with excellent property.

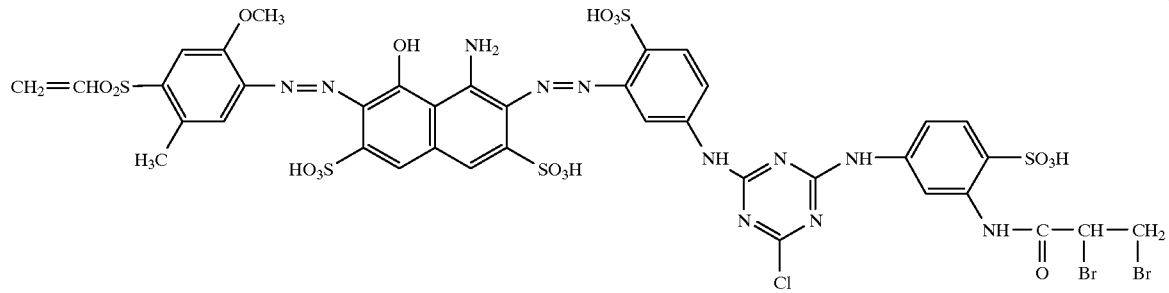

(I-5)

EXAMPLE 6

Refer to the procedure of example 4, substitute 4-((2-(sulfooxy) ethyl) sulfonyl) phenylamine With 4-(vinyl sulfonyl)-2-methoxy phenylamine, to obtain blue dyestuff of formula (I-6). After salting, drying and grinding, a blue dye powder could be obtained. The dyestuff can be used to dye objects in blue, with excellent property.

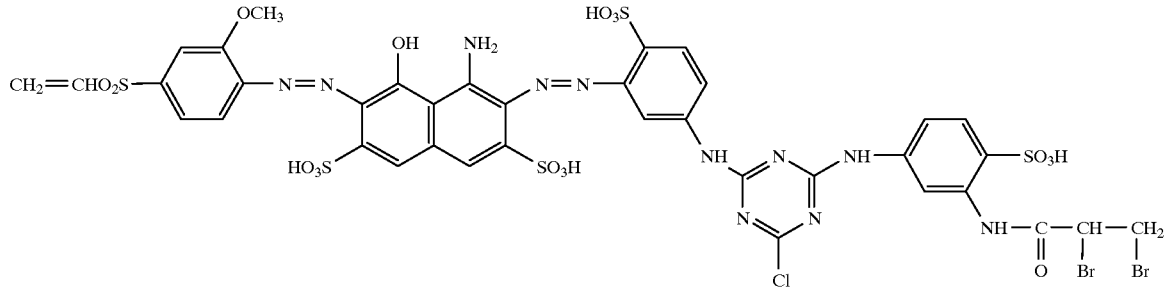

(I-6)

EXAMPLE 7

The dyestuff of formula (I-1) was dissolved in 100 ml of water and sodium hydroxide solution was added to control the pH between 12–12.5. The mixture was stirred at the

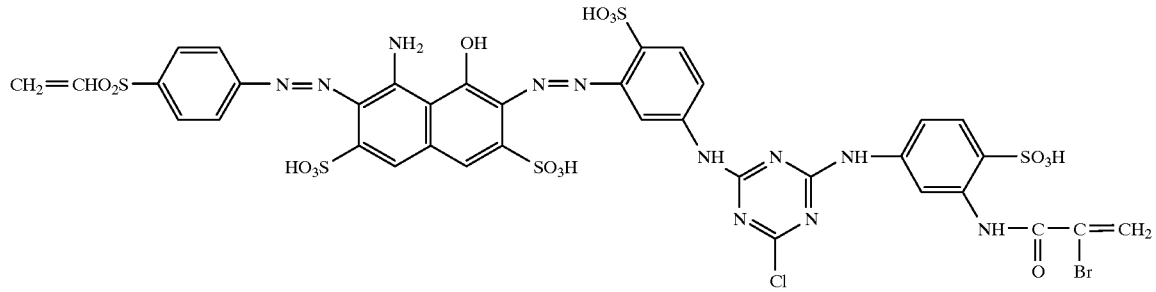

(I-7)

EXAMPLE 8–12
Refer to the procedure of example 7, substitute (I-1) With (I-2), (I-3), (I-4), (I-5), and (I-6), to obtain blue dyestuffs of formula (I-7), (I-8), (I-9), (I-10), (I-11), and (I-12). The structure of the formula (I-8) is the same as that of the formula (I-9). These dyestuffs can be used to dye objects in blue, with excellent property.
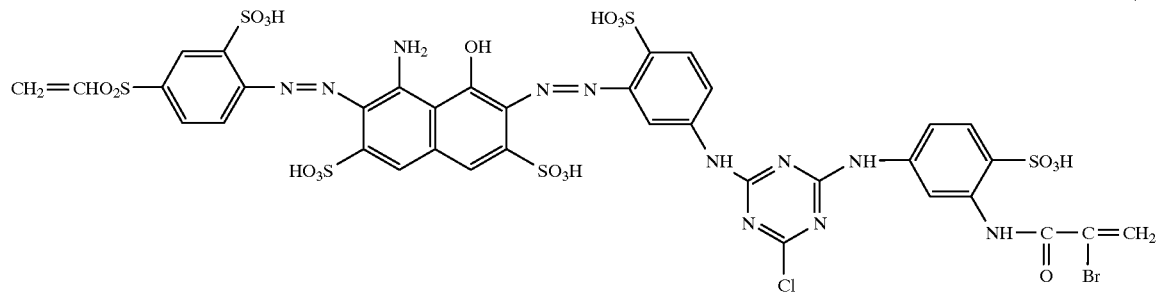
(I-8)
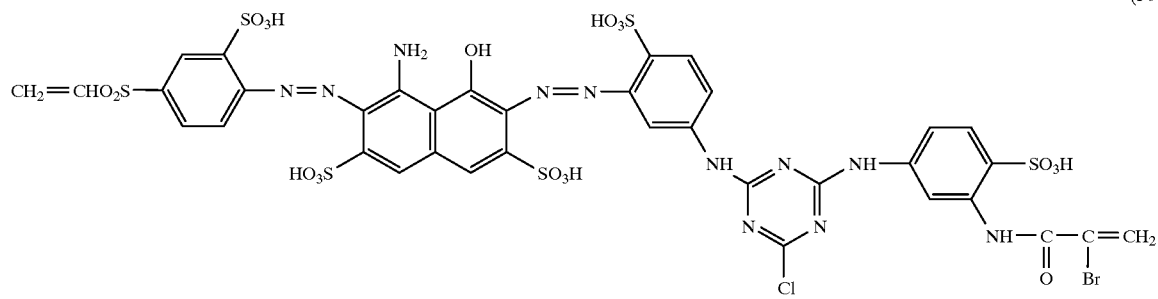
(I-9)
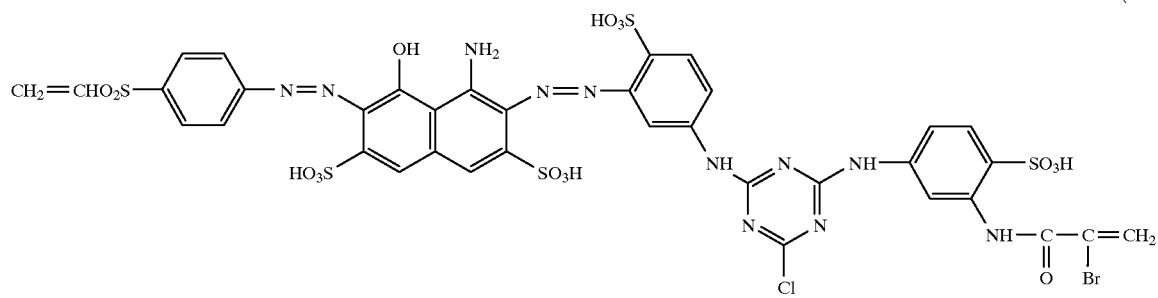
(I-10)
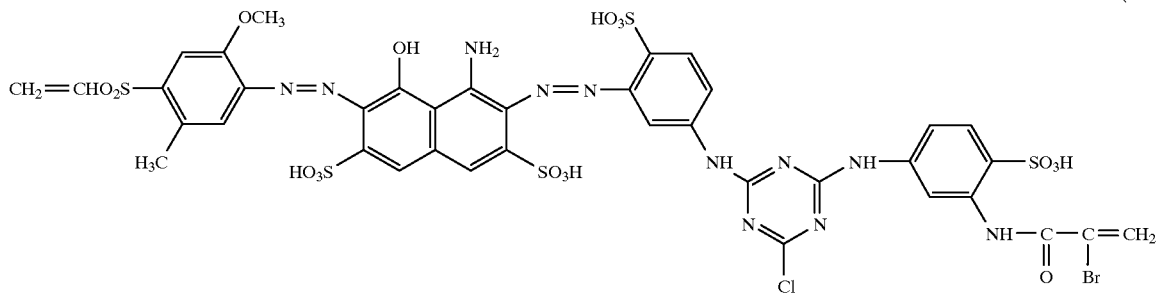
(I-11)

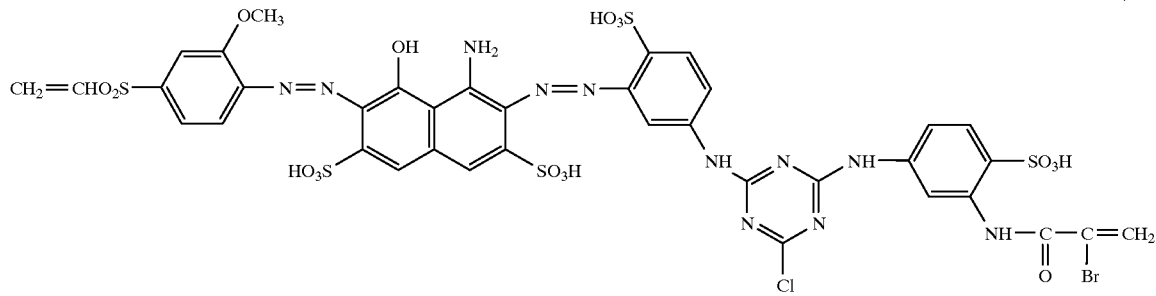

(I-12)

EXAMPLE 13

Diazonium salt of 4-((2-(sulfooxy) ethyl) sulfonyl) phenylamine (prepared from 8.4 g 4-((2-(sulfooxy) ethyl) sulfonyl) phenylamine) was added into a solution of 1-amino-8-hydroxyl naphthalene-3,6-disulfonic acid (9.6 g) in 100 ml of water. Sodium bicarbonate was used to control the pH between 1.0 to 3.0, and the mixture was stirred until full reaction to obtain solution (13A).

Trichlorotriazine (5.5 g) was first uniformly distributed in ice water (50 ml), then a solution of 2,4-diamino benzene sulfonic acid (5.6 g) in 150 ml of water was added. The mixture was then stirred for half hour and the pH was controlled between 6.0 to 6.5 for the full reaction. Then the resultant mixture was formed the diazonium salt solution by known methods. The diazonium salt solution was added to the above solution (13A) and stirred at a pH of 6.0–6.5 until fully reacted. Then a solution of 2,4-diamino benzene sulfonic acid (5.6 g) in 100 ml of water was added. The pH was controlled between 5.5 to 6.0 and temperature was controlled at 30° C. The solution was stirred until full reaction. Then the solution temperature was controlled at 5° C. and 2,3-dibromo propanoyl chloride (7.5 g) was added. The solution was stirred until full reaction, and the dyestuff of the following formula (I-13) could be obtained. After salting, drying and grinding, a blue dye powder could be obtained. The dyestuff can be used to dye objects in blue, with excellent property.

sulfonic acid (5.6 g) in 150 ml of water was added. The mixture was then stirred for half hour and the pH was controlled between 6.0 to 6.5 for the full reaction. Then the resultant mixture was formed the diazonium salt solution (14A) by known coupling reaction methods.

Diazonium salt of 2-amino-5-((2-(sulfooxy) ethyl) sulfonyl) benzene sulfonic acid (prepared from 13.91 g 2-amino-5-((2-(sulfooxy) ethyl) sulfonyl) benzene sulfonic acid was added into a solution of 1-amino-8-hydroxyl naphthalene-3,6-disulfonic acid (9.6 g) in 100 ml of water. Sodium bicarbonate was used to control the pH between 1.0 to 3.0, and the mixture was stirred until full reaction. Then the above solution (14A) was added into the above mixture. The resultant mixture was controlled at the pH between 6.0–6.5 and was stirred until full reaction to obtain the solution (14B).

2,3-dibromo propanoyl chloride (7.5 g) was added into a solution of 2,4-diamino benzene sulfonic acid (5.6 g) in 100 ml of water to form the solution (14C). Then the solution (14B) was added into the solution (14C). The pH was controlled between 5.5 to 6.0 and temperature was controlled at 30° C. The solution was stirred until full reaction, and the dyestuff of the following formula (I-14) could be obtained. After salting, drying and grinding, a blue dye powder could be obtained. The dyestuff can be used to dye objects in blue, with excellent property.

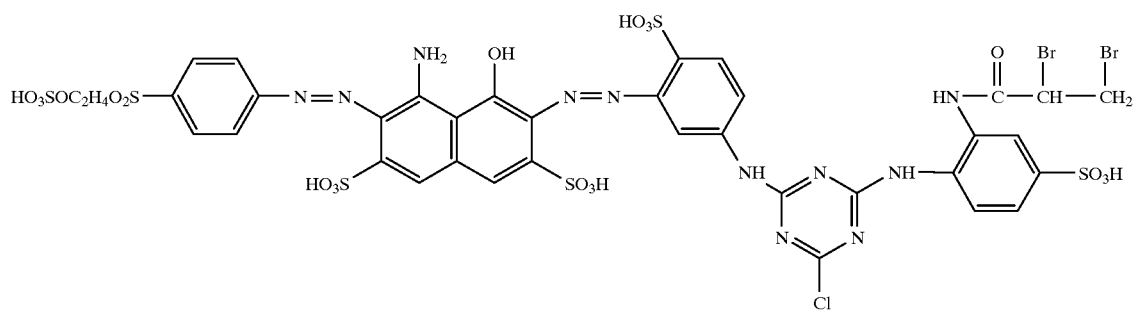

(I-13)

EXAMPLE 14

Trichlorotriazine (5.5 g) was first uniformly distributed in ice water(50 ml), then a solution of 2,4-diamino benzene

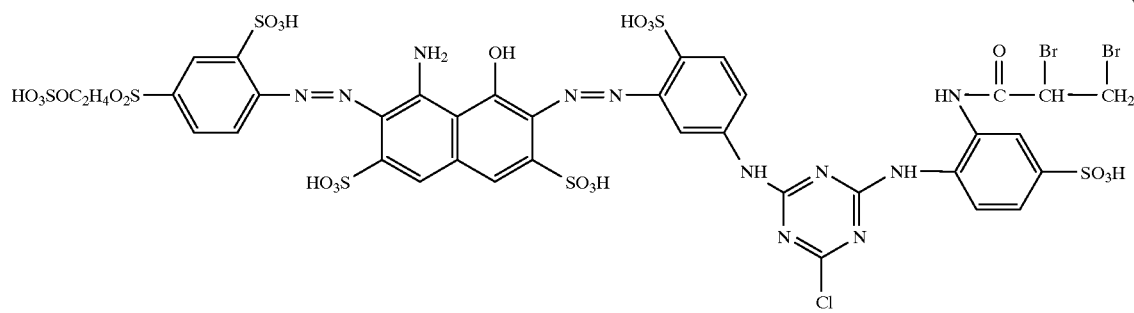

(I-14)

EXAMPLE 15

Trichlorotriazine (5.5 g) was first uniformly distributed in ice water(50 ml), then a solution of 2,4-diamino benzene sulfonic acid (5.6 g) in 150 ml of water was added. The mixture was then stirred for half hour and the pH was controlled between 6.0 to 6.5 for the full reaction. Then the resultant mixture was formed the diazonium salt solution (15A) by known methods. a solution of 1-amino-8-hydroxyl naphthalene-3,6-disulfonic acid (9.6 g) in 100 ml of water was added into the solution (15A). The mixture was stirred at the pH below 3.0 ant the temperature at 5° C. until full reaction. Then a diazonium salt of 2-amino-5-((2-(sulfooxy) ethyl) sulfonyl) benzene sulfonic acid (13.91 g) in 50 ml of water was added. The resultant mixture was controlled at the pH between 6.0–6.5 and was stirred until full reaction to form the solution (15B).

2,3-dibromo propanoyl chloride (7.5 g) was added into a solution of 2,4-diamino benzene sulfonic acid (5.6 g) in 100 ml of water to form the solution (15C).

Then the solution (15B) was added into the solution (15C). The pH was controlled between 5.5 to 6.0 and temperature was controlled at 30° C. The solution was stirred until full reaction, and the dyestuff of the following formula (I-15) could be obtained. After salting, drying and grinding, a blue dye powder could be obtained. The dyestuff can be used to dye objects in blue, with excellent property.

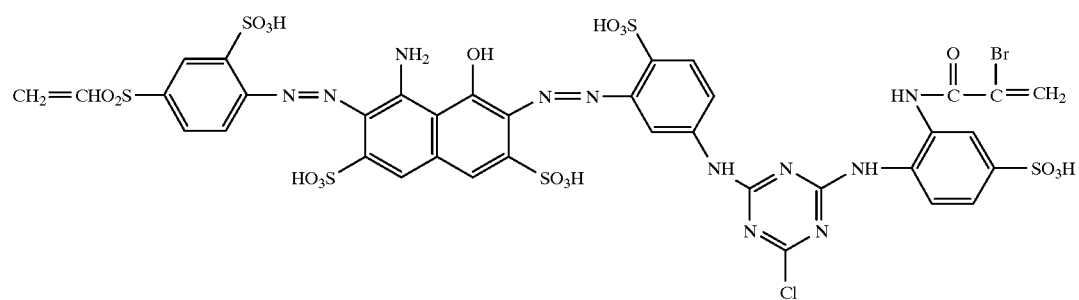

(I-15)

EXAMPLE 16–18

Refer to the procedure of example 7, substitute (I-1) With (I-13), (I-14), and (I-15), to obtain blue dyestuffs of formula (I-16), (I-17), and (I-18). These dyestuffs can be used to dye objects in blue, with excellent property.

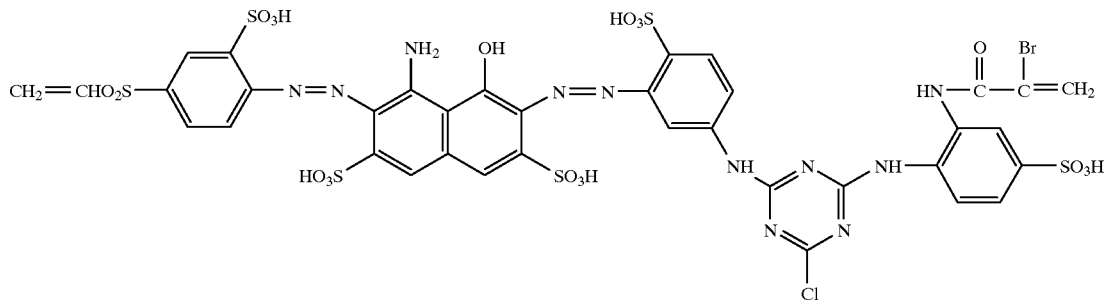
(I-16)

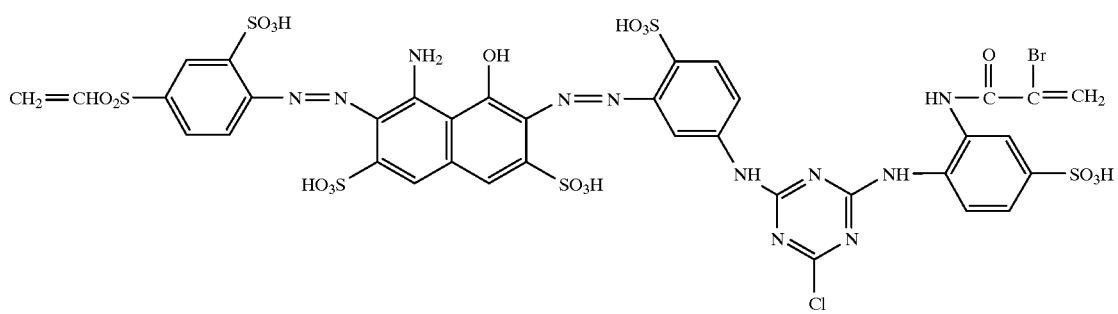
(I-17)

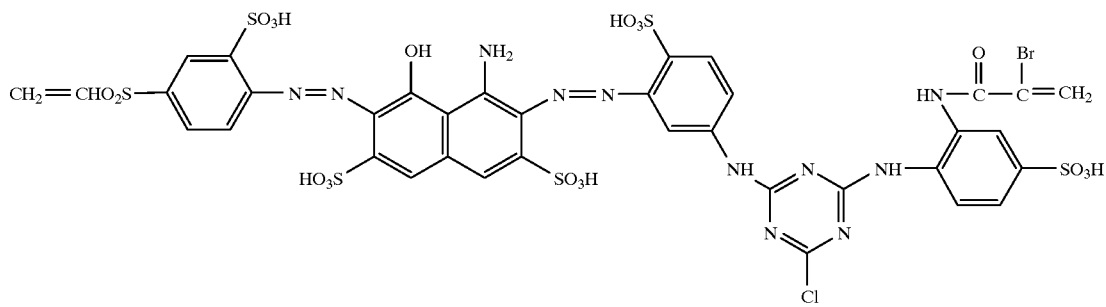
(I-18)

From the foregoing description, one skilled in the art can easily ascertain the essential characteristics of this invention, and without departing from the scope thereof, can make various changes and modifications of the invention to adapt it to various usages and conditions. Thus, other embodiments are also within the claims.

What is claimed is:

1. A blue reactive dyestuff of the formula (I)

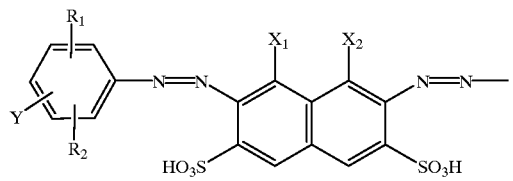

(I)

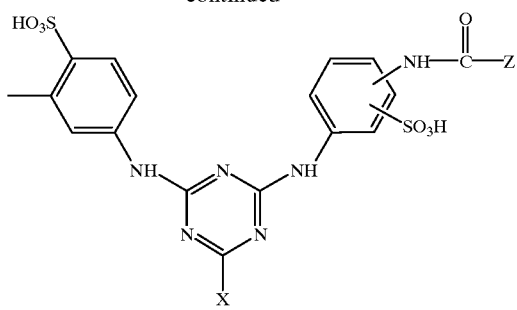

-continued wherein:
$R_1$ and $R_2$ each independent is hydrogen, halogen, $C_{1-4}$ alkyl, $C_{1-4}$ alkoxyl, or sulfonyl groups;
X is halogen or quaternary ammonium;
$X_1$ and $X_2$ each independent is hydroxyl or amino;
Y is —$SO_2CH_2$=$CH_2$ or —$SO_2C_2H_4W$, W is a leaving group which is eliminable by a base;
Z is —$CHTCH_2T$ or —CT=$CH_2$, T is halogen, —OH, —$OSO_3H$, or a leaving group which is eliminable by a base.

2. A blue reactive dyestuff of claim 1, wherein W is —$OSO_3H$.

3. A blue reactive dyestuff of claim 1, wherein T is bromine.

4. A blue reactive dyestuff of claim 1, wherein X is Cl.

5. A blue reactive dyestuff of claim 1, wherein $X_1$ is hydroxyl and $X_2$ is amino.

6. A blue reactive dyestuff of claim 1, wherein $X_1$ is amino and $X_2$ is hydroxyl.

7. A blue reactive dyestuff of claim 1, wherein said formula (I) is the compound of formula (I-1)

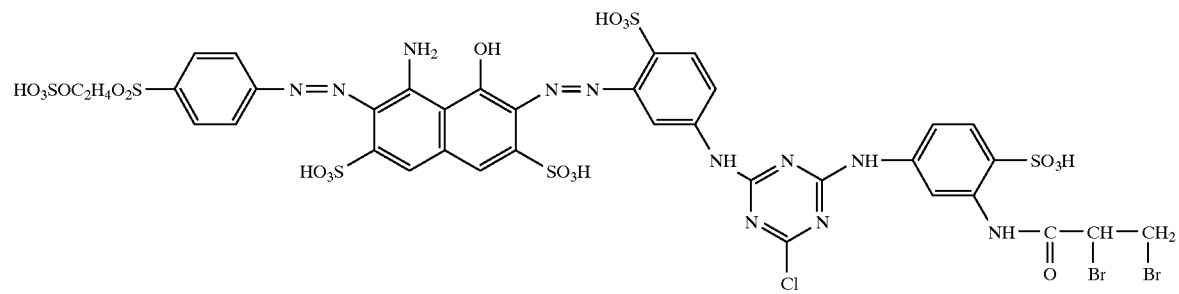

(I-1)

8. A blue reactive dyestuff of claim 1, wherein said formula (I) is the compound of formula (I-2)

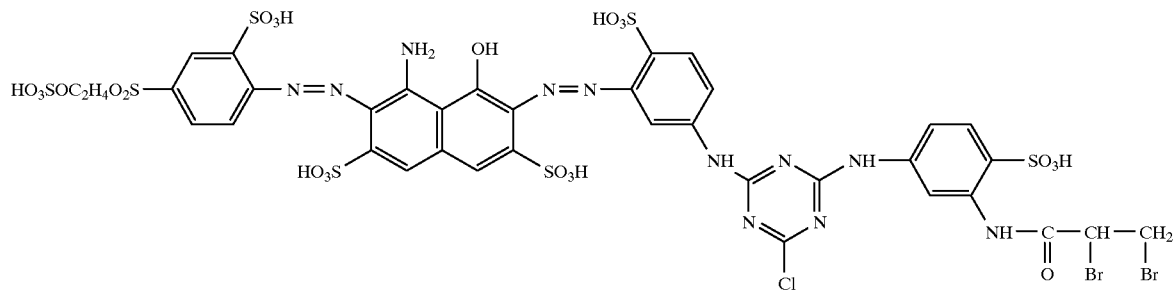

(I-2)

9. A blue reactive dyestuff of claim 1, wherein said formula (I) is the compound of formula (I-4)

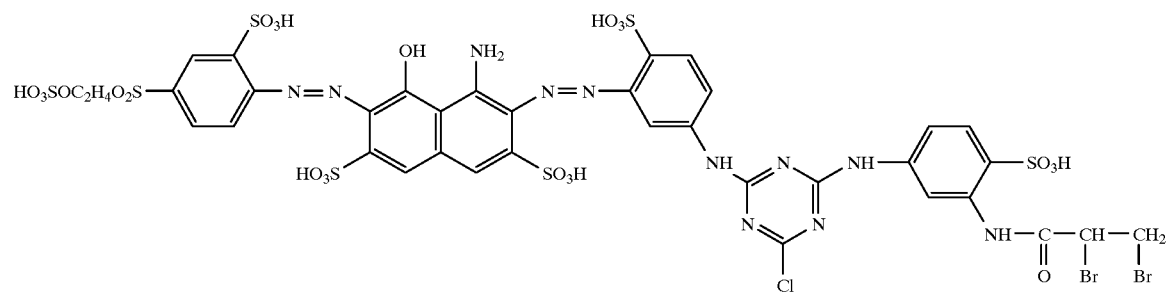

(I-4)

10. A blue reactive dyestuff of claim 1, wherein said formula (I) is the compound of formula (I-8)

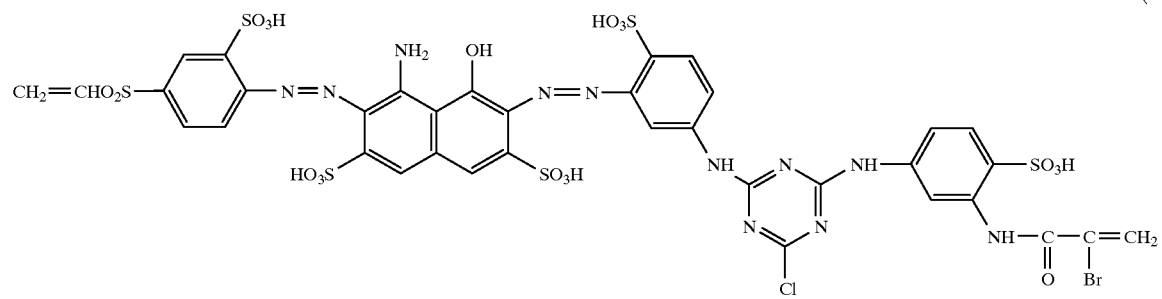
(I-8)
11. A blue reactive dyestuff of claim 1, wherein said formula (I) is the compound of formula (I-14)
(I-14)
12. A blue reactive dyestuff of claim 1, wherein said formula (I) is the compound of formula (I-15)
13. A blue reactive dyestuff of claim 1, wherein said formula (I) is the compound of formula (I-17)
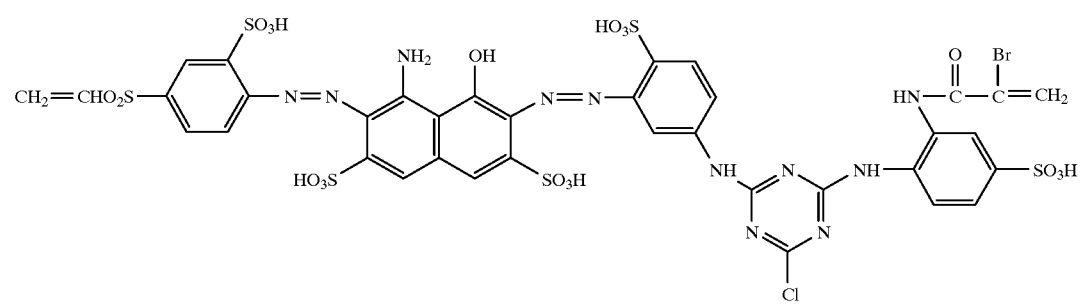
(I-15)

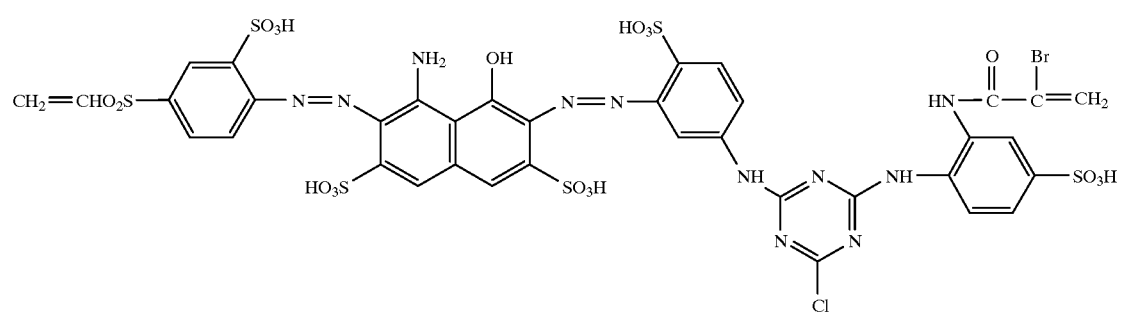
(I-17)